United States Patent [19]

Anderson, Jr.

[11] Patent Number: 4,593,396

[45] Date of Patent: Jun. 3, 1986

[54] PROCESS FOR A FAULT-TOLERANT DATA PROCESSING SYSTEM WITH ERROR DETECTION AND RESISTANCE TO FAULT PROPAGATION

[75] Inventor: Robert L. Anderson, Jr., Salem, Oreg.

[73] Assignee: August Systems, Tigard, Oreg.

[21] Appl. No.: 433,501

[22] Filed: Oct. 8, 1982

[51] Int. Cl.[4] .............................................. G06F 11/08
[52] U.S. Cl. ..................................... 371/68; 364/200
[58] Field of Search ... 364/200 MS File, 900 MS File; 371/36, 68

[56] References Cited

U.S. PATENT DOCUMENTS

| | | | |
|---|---|---|---|
| 3,681,578 | 8/1972 | Stevens | 371/36 |
| 3,783,250 | 1/1974 | Fletcher et al. | 371/36 |
| 3,848,116 | 11/1974 | Möder et al. | 371/36 |
| 4,015,246 | 3/1977 | Hopkins, Jr. et al. | 364/200 |
| 4,326,291 | 4/1982 | Marsh et al. | 371/68 |
| 4,342,083 | 7/1982 | Freedman et al. | 364/200 |
| 4,356,546 | 10/1982 | Whiteside et al. | 364/200 |

*Primary Examiner*—Gareth D. Shaw
*Assistant Examiner*—Daniel K. Dorsey
*Attorney, Agent, or Firm*—Thomas E. Schatzel

[57] ABSTRACT

A process for assuring that the individual computational elements of a fault-tolerant computer system have the same view of the external world when applied in applications where input data representations of the same quantity may have slight variations without being incorrect. The process transmits data between each of the computational elements through circuitry utilizing transmitters and receivers, and provides a check as to the accuracy of each such transmission, resulting in each computational element either having the same plurality of data as each other computational element, or a representation that a transmission was faulty.

15 Claims, 2 Drawing Figures

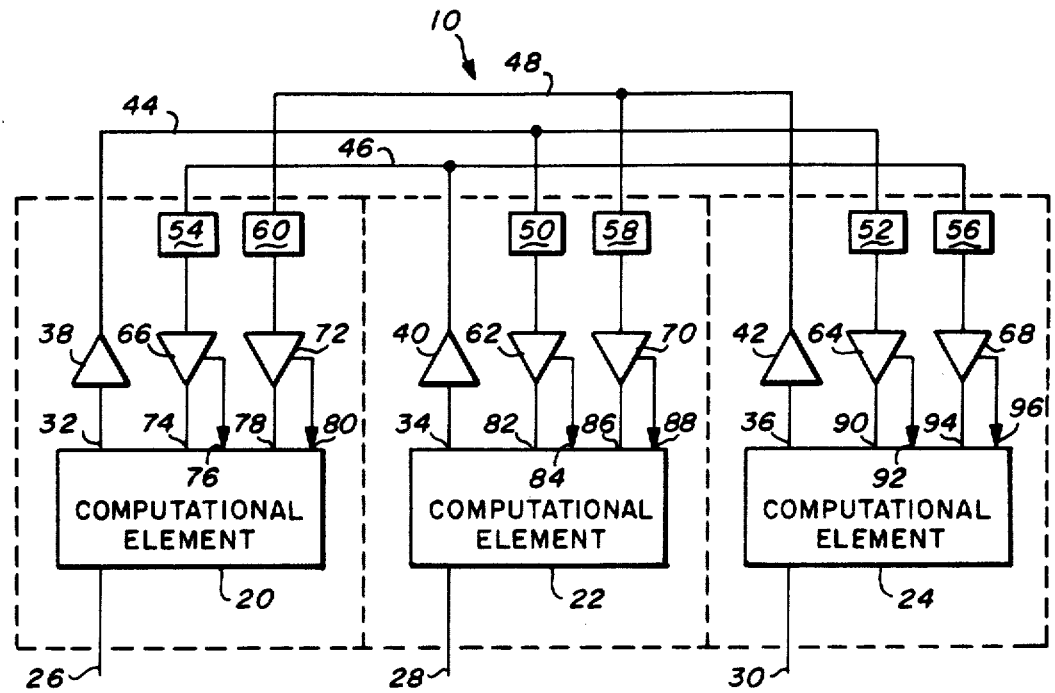
Fig_1
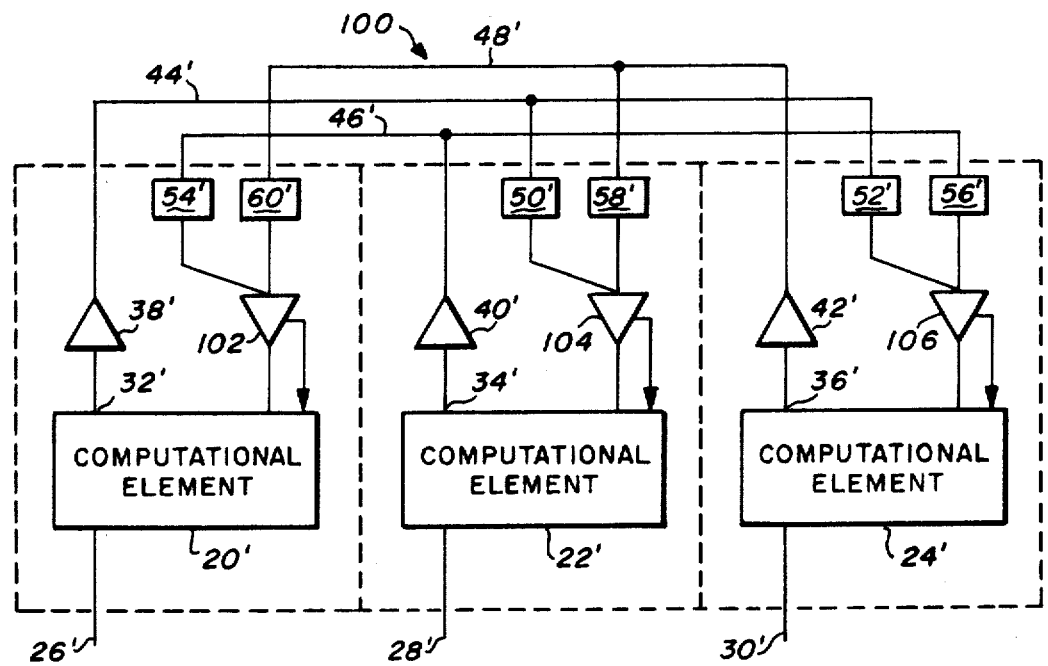
Fig_2

PROCESS FOR A FAULT-TOLERANT DATA PROCESSING SYSTEM WITH ERROR DETECTION AND RESISTANCE TO FAULT PROPAGATION

BACKGROUND OF THE INVENTION

1. Field of the Invention

The invention relates generally to fault tolerant computer systems, and more particularly to processes for assuring that the computational elements in multi-computer fault-tolerant computer systems start with the same data base of data.

2. Description of the Prior Art

Computer systems for use in applications requiring extreme reliability can be developed through either of two basic approaches. One approach is to build the system fault-resistant; that is, such that each element of the system is unlikely to fail. The other approach is to build the system fault-tolerant. The latter approach comprises redundant components together with a method of selection as to which results are accepted from the redundant components so as to allow some components within the system to fail, and still have the system produce the proper result. A number of articles discussing various aspects of fault-tolerant computer systems appear in *Proceedings of the IEEE,* Volume 66, No. 10, October, 1978. Fault-tolerant computer systems which begin with a single data source and utilize multiple computational elements operate on the principle that each identical computational element, starting with the same data and implementing the same program, will produce the same result unless a fault is present in the system. The common approach to such a system utilizes circuitry on the output of the multiple computational elements which selects an output which is consistent with a majority of the computational elements as the output for the system.

In applications where the source of the computer systems' input data is also subject to faults, redundancy in that area can also be utilized. So long as these redundant input sources must produce identical data unless one is faulted, such a system will operate in the same manner as that described above. Some applications will result in systems where there can be slight variations in the input data between various input sources, without any of such data necessarily being "wrong." This is a common problem in applications where the computer system is utilized to control a process and the input data involves the measurement of a physical property of a continuous nature such as temperature or pressure. Frequently, an analog transducer is used in the sensing circuitry and its output converted to digital data, with slight variation resulting in the various transducer or converter outputs.

In a computer system employing multiple redundant computational elements, it is necessary that all of the computational elements utilize the same input data. Further, if the system is intended to tolerate one of the computational elements becoming faulty, then all the non-faulty computational elements should utilize the same input data, regardless of the behavior of the faulty one. It can be shown that for prior art systems, one computational element can become faulty in such a way that the non-faulty computational elements will not utilize the same input data and, therefore, will not necessarily produce the same results. The particular use of three redundant computational elements has been studied extensively in the literature under the general topics of "Achieving Interactive Consistency" and "The Byzantine General's Problem". The general problem discussed in the literature can be illustrated with a particular example. Assume three computational channels (CAA, CBB and CCC). Each read some physical property, such as flow or temperature, and they receive slightly differing data, such as 372, 374, 376 respectively, because of the inherent small differences between their analog converter devices. In order that the three computational channels all utilize the same input, each of them communicates their view of the data to each other. Each of them then uses the same method to select the value to be used, such as the average or the middle value, to be used in subsequent calculations. By this means, all computational channels will carry out the same calculation and arrive at the same results. Consider now that CAA becomes faulty and does not communicate the same data to CCB and CCC, specifically instead of its data (372 in this example), it communicates 374 to CCB and 378 to CCC. Each of CCB and CCC properly communicates their data (374 and 376, respectively) to the other two computational channels. The three computational channels now possess the following views of the data:

CCA has 372 as its own data and 374 and, 376 from the others

CCB has 374 as its own data and 374 and 376 from the others

CCC has 376 as its own data and 376 and 378 from the others

Each computational channel now applies a selection algorithm, but because of the disparity of their sets of input data, they will select differing values and computations that rely on that data can produce different results, thereby defeating the attempt of the system to be able to tolerate a fault without distorting the system. Other examples of the problem of achieving interactive consistency occur in modular redundancy schemes and have been discussed in the literature.

SUMMARY OF THE PRESENT INVENTION

It is therefore an object of the process of the present invention to assure that the computational elements of a fault-tolerant computer system are provided with a consistent view of the external world when applied where input data from different redundant sources can vary without necessarily being incorrect, and whereby each of the computational elements of said system can, if functioning correctly, produce results consistent with each other computational element.

It is a further object of the process of the present invention to distribute data in a fault-tolerant computational system such that redundant input devices measuring physical properties of a continuous nature can be utilized without defeating the effectiveness of the fault-tolerant architecture of the computer system.

Briefly, the present invention includes steps in a process of communication between multiple computational elements of a fault-tolerant computer system. In the preferred embodiment, three substantially identical computational elements are matched with three substantially identical input devices, each such input device providing its respective computational element with information about the outside world (the world outside the computer system). Each such input device is connected to provide data which is representative of some specific quantity such as the temperature of a specific mass at a specific place and time. The process of the present invention has primary applicability where each of the substantially identical input devices, each designed to provide data which is representative of the same quantity (such as the temperature referred to above) can produce a slightly different value to its respective computational element as compared with each other input device, without any such input device being necessarily "wrong." That is a typical condition where a continuous property such as temperature is converted via a transducer to an analog signal which is then converted to a digital value. Slight variation in the resulting output can occur due to the many critical areas of manufacture and operating conditions for such devices.

The process of the preferred embodiment of the present invention takes the three values from the three input devices and inputs each into a different computational element. Each computational element may do some minor manipulation of that data such as scaling and rounding or truncating, and then stores the resulting value as its "personal value" corresponding to the view of the outside world provided by its respective input device. Each of the computational elements then transmits its "personal value" to each of the other computational elements utilizing one encoding transmitter and one transmission line associated with each respective computational element, and a separate decoding receiver between each transmission line and each receiving computational element. Thus, for a three-computational element system, there are three encoding transmitters, three transmission lines, and six decoding receivers. The data sent over the transmission lines by the encoding transmitter includes redundant data so that the decoding receiver can form a determination as to whether the data was properly received. A failure either of the transmitter or in the transmission results in the decoding receiver detecting a descrepancy between the data and the redundant data, and the receiver sending an error message as well as the decoded data to the computational element to which the data was so sent.

Each computational element therefore has its own "personal value" and the data received from each of the other computational elements representing their respective "personal values." Along with those representations of the other computational element's "personal values," each computational element also has information relating to the validity of the transmission of that data.

A second round of transmission of data is then performed. In this round, the data in each computational element representing the "personal values" of the other computational elements are transmitted to each other computational element through the same transmission and error detection method used when each computational element transmits its own "personal value." The result is that each of the three computational elements contains three separate sets of data: (1) its own "personal value"; (2) the "personal values" of each of the other two computational elements as sent by those respective computational elements; and (3) the "personal values" of each of the other two computational elements as transmitted second hand from the computational elements receiving those values in the first round of transmissions.

Each computational element accepts as representative of the "personal value" for each of the other computational elements, the first representative value for each such "personal value" which it receives without an error message, or in the case where it receives both transmissions representing one computational element's "personal value" with error messages, it takes an arbitrary default value, and declares the respective computational element defective. Absent such a default, each computational element thus contains the identical view of the outside world, because each computational element now contains the identical three values which each of the other two computational elements contain.

The three computational elements then proceed to process the identical data sets with identical programs in accordance with whatever the function of the fault-tolerant computer system requires. A typical algorithm for handling the three potentially different data within the three identical data sets, selects the intermediate value. However, regardless of what method is used to resolve the differences, including taking an average, or a weighted average, or an average after eliminating data outside of a given range based on some other criteria, since the three computational elements begin with the same view of the external world (that is, all three computational element have the same three data), the output decision of all three computational elements will be identical so long as each is properly functioning. If the output of one such computational element is different from the other two, the value of the two is used as the system output, and the computational element which produced an output which disagrees is declared faulty.

In the case where the personal value of one of the computational elements is not received without error messages at the other computational devices through either of the transmissions, that computational element's output is then subsequently ignored, and the other two computational elements proceed to determine an output which is independent of the values received for the computational device now declared faulty. Basing their respective calculations only on the remaining two input data, the other two computational devices will, if neither is defective, produce identical results. That result will be used as the system output.

The term "input data" should be interpreted in a broad sense, and it should be recognized that the process of the present invention has applicability where "input data" includes data such as clock or counter information, or other internally generated independent data. It should similarly be recognized that references to "a view of the external world" is not intended to exclude the inclusion of said internally generated independent data from inclusion with externally generated data when applying the process of the present invention.

An advantage of the process of the present invention is that it assures that the computational elements of a fault-tolerant computer system are provided with a consistent view of the external world when applied where input data from different redundant sources can vary without being incorrect, and whereby each of said computational elements of the system can, if functioning correctly, produce results consistent with each other computational element.

A further advantage of the process of the present invention is that it distributes data in a fault-tolerant computer system such that redundant input devices can be utilized in applications measuring physical properties of a continuous nature without defeating the effectiveness of the fault-tolerant architecture of the computer system.

These and other objects and advantages of the present invention will no doubt become obvious to those of ordinary skill in the art after having read the following detailed description of the preferred embodiment, which is illustrated in the various drawing figures.

IN THE DRAWING

FIG. 1 is a diagram of a three computational element fault-tolerant computer system which may be utlized with the process of the present invention; and FIG. 2 is a diagram of a further three computational element fault-tolerant computer system which may be utilized with the process of the present invention.

DETAILED DESCRIPTION OF THE PREFERRED EMBODIMENT

FIG. 1 illustrates a fault-tolerant computer system referred to by the general reference number 10, which utilizes a set of three substantially identical computational elements, 20, 22, and 24, arranged in a manner so as to allow implementation of the process of the present invention. The computational elements 20, 22, and 24 can be any form of computer, standard or nonstandard, which includes a memory. Each of the computational elements 20, 22, and 24 has an input port 26, 28, and 30, respectively, and an output port 32, 34, and 36, respectively. Each said output port 32, 34, and 36 is connected to an encoding transmitter 38, 40, and 42, respectively. Said encoding transmitters are well known in the art, and simply act to translate data into a form suitable for transmission, and also include in such transmission a redundant component which allows a check of the accuracy of such transmission. Each said encoding transmitter 38, 40, and 42 is in turn connected to a transmission line, 44, 46 and 48, respectively, which acts to carry the data between computational elements. Each of said transmission lines is in turn connected to a set of two isolation elements 50 and 52, 54 and 56, and 58 and 60, respectively, each of which is connected to a decoding receiver 62, 64, 66, 68, 70, and 72, respectively. Said decoding receivers 62 through 72 are also well known in the art and simply act to receive the transmission from said encoding transmitters, check for any discrepancy between the data component and the redundancy component of the transmission, and then deliver the data portion of the transmission to the appropriate computational element 20, 22, or 24, along with a signal referred to as an error message designating the presence of said discrepancy between the data component and the redundancy component if such was detected. The computational elements 20, 22, and 24 each have a set of four auxiliary input ports: 74, 76, 78 and 80 on computational element 20; 82, 84, 86 and 88 on computational element 22; and 90, 92, 94 and 96 on computational element 24. The data from the decoding receiver 66 enters computational element 20 through auxilliary input port 74 and the error message, if present, enters computational element 20 through auxilliary input port 76. Similarly, the data and error message signals from decoding receiver 72 enter computational element 20 through auxiliary input ports 78 and 80, respectively. The data and error message signals from decoding receivers 62 and 70 enter computational element 22 through auxilliary input ports 82, 84, 86 and 88, respectively, and the data and error message signals from decoding receivers 64 and 68 enter computational element 24 through auxilliary input ports 90, 92, 94 and 96, respectively.

The operation of the fault-tolerant computer system 10 for process control requires that the system 10 be provided with input data providing information, or a view of the external world (external to the computer system) which is being monitored and controlled. The original source of such data may be from any number of types of transducers which respond to some characteristic in the environment and produce a signal which provides a measurement of that characteristic. If such a transducer provides an analog signal, an analog-to-digital converter would be required to provide the binary form of data that the computational elements 20, 22 and 24 are able to handle.

Regardless of the type of input source, the present invention contemplates three substantially identical input sources providing binary signals to input ports 26, 28 and 30. These input sources all provide data corresponding to measurements of the same characteristic and hence have only slight variation between them as long as all of the devices in the input circuitry are functioning properly. Each of the three computational elements 20, 22 and 24 are substantially identical and are operating with the identical computer program for controlling whatever process the system 10 is applied to control.

The process of the present invention operates as follows. Each computational element 20, 22 and 24 samples the input data from the input ports 26, 28 and 30, respectively, and stores a value in its respective memory corresponding to the data which was present at its respectively input port at the time of the data sampling. If all of the computational elements 20, 22 and 24, along with the associated input circuitry, are operating properly, the data thus stored in the computational elements are very similar although each such datum may not be identical to the other two. These data, now stored in their respective computational elements, become each computational element's "personal value".

Computational element 20 then transmits its "personal value" through output port 32 to encoding transmitter 38 which accepts the datum in a parallel format and converts it to a serial format, encoding with the data component an additional redundancy component. The encoding transmitter 38 then transmits both the data component and the redundancy component serially over transmission line 44 through isolation elements 50 and 52 to decoding receivers 62 and 64, respectively. The isolation elements 50 and 52 are circuits, known in the art, which isolate the transmission line from defects or disturbances emanating from the decoding receivers 62 or 64. Therefore, a fault in decoding receiver 62 will not affect the ability to transmit over transmission line 44 to decoding receiver 64 and vice versa.

Decoding receiver 62 separates the data component from the redundancy component of the signal received from transmission line 44 and compares the two as a check of the accuracy of the transmission. Decoding receiver 62 supplies the data component to computational element 22 at auxiliary input port 82, and supplies an error signal to the computational element 22 at auxiliary input port 84 if there was a discrepancy between the data component and the redundancy component received. Computational element 22 stores this data component, along with the error message if present, and identifies it all as being received from computational element 20. Decoding receiver 64 functions in the same manner as decoding receiver 62, and computational element 24 receives data in the same manner as computational element 22.

Simultaneous with the above described transmission of the "personal value" for computational element 20 to computational elements 22 and 24, computational element 22 transmits its "personal value" to computational elements 20 and 24 through encoding transmitter 40, transmission line 46, isolation elements 54 and 56, and decoding receivers 66 and 68. Computational element 24 also simultaneously transmits its "personal value" to computational elements 20 and 22 via encoding transmitter 42, transmission line 48, isolation elements 60 and 58, and decoding receivers and 72 and 70.

Each of the computational elements 20, 22 and 24 has thus stored a value as its "personal value", corresponding to the reading which it took at its input port 26, 28 or 30, respectively, and has stored data from each other computational element representing the "personal value" of each other computational element. Associated with each value received by transmission between computational elements is also information concerning the reliability of its respective transmission. That is, for any transmission received where there was a discrepancy between the data component and its redundancy component, there is an error message also stored.

A second round of transmissions now transmits the data which each computer received in the prior transmission to the other computational elements. The second round of transmissions can be understood most easily by example. The "personal value" for computational element 20 is, after the prior transmission round, represented in computational element 22 (as well as in computational element 24) in the form of a data component, and possibly an error message. This data component in computational element 22 is transmitted to computational element 24 through encoding transmitter 40, transmission line 46, isolation element 56 and decoding receiver 68. That transmission is similarly done with the use of a redundancy component and generation of an error message if the redundancy component does not match the data component when received. If an error message was received by computational element 22 associated with the prior transmission of that data component, that error message is transmitted so that computational element 24 will receive an error message if there was a discrepancy in the transmission of the data in either transmission round. Computational element 24 now has stored in its memory its own "personal value", a representation of the "personal value" of computational elements 20 and 22 as received by transmission from those computational elements, and a representation of the "personal value" of computational element 20 as transmitted by computational element 22 in the second round of transmissions. This second round of transmissions also provides computational element 24 with a representation of the "personal value" of computational element 22 as transmitted from the value which computational element 20 has stored as representing the "personal value" of computational element 22. Similarly, in this second round of transmissions, computational element 20 obtains second hand representations of the "personal values" of computational elements 22 and 24, and computational element 22 receives second hand representations of the "personal value" of the computational elements 20 and 24.

Each computational element has thus received two representations of the "personal values" of each of the other computational elements. Each computational element accepts the first transmission which it receives without an error message as an accurate representation of the "personal value" of the computational element which it is intended to represent. If both transmissions associated with one computational element's "personal value" are received with error messages, the computational element whose "personal value" is thus not received unaccompanied by an error message is determined to be faulty, and a predefined default value is substituted as representing that computational element's "personal value".

Each computational element thus has stored in its memory a value associated with each computational element as that computational element's "personal value". So long as default values are not present, each computational element now has the same three values and hence the same view of the external world. To the extent default values are present, each computational element containing default values has already declared one of the other computational elements faulty.

Various algorithms can be used to handle the three values which may not be identical, and in the event of a defect in some of the input circuitry, may be sustantially different. However, since the substantially identical computational elements 20, 22 and 24 all have the identical three input values corresponding to the "personal values" of each such computational element, and have identical programing, each should provide an identical output unless one is faulty. A simple voter circuit such as the one disclosed in pending application Ser. No. 06/205,935 filed 11-12-1980 (assigned to the same assignee as the present application) allows the selection of an output from the three computational elements which corresponds to the output of the majority of the computational elements, thus discounting the result of a faulty computational element.

Among the various ways in which the different values of the three "personal values" can be handled is by each computational element selecting the median value as the appropriate value. Other means such as an average, a weighted average, or an average after disregarding data outside specific limits may be utilized. The elimination of "personal values" which are default values would be typical.

There can be any number of applications for fault-tolerant computer systems utilizing the present invention, and hence an infinite variety of calculations may be performed between the process of the present invention for assuring agreement in the view of the external world by the computational elements, and the final output of the fault-tolerant computer system 10.

FIG. 2 illustrates a further fault-tolerant computer system referred to by the general reference number 100. The elements are generally identical to the elements in FIG. 1, and are designated by the same numbers with a prime, with additional numbers designating elements only where the system 100 differs from the system 10.

The operation and functioning of the fault-tolerant computer system 100 and the process for assuring agreement in the view of the external world for that system is similar to that described above except that each computational element 20', 22' and 24' is provided with only a single receiving decoder 102, 104 and 106, respectively, instead of with two decoding receivers each. The consequence is that each of said decoding receivers 102, 104 and 106 must decode signals from two of said transmission lines 46 and 48, 44 and 48, and 44 and 46, respectively. It is therefore necessary to transmit on said respective transmission lines at different times. This is only feasible in systems with relatively low required rates of data transfer.

Although the present invention has been described in terms of presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. In a multiple computational element fault-tolerant computer system for receiving data from a plurality of input devices where data provided to said computational elements from said input devices may differ without being incorrect, a process for attaining agreement in an input data set utilized by each of a plurality of said computational elements, the process comprising the steps of:
   a. applying one of a plurality of "n" input signals to a plurality of "n" computational elements with each said computational element storing a value therein corresponding to its respective input signal, said value thereby becoming said computational elements "personal value" of the input signals;
   b. each of said computational elements transmitting its "personal value" to each other of said computational elements by means of an encoding transmitter associated with each of said computational elements and each of said computational elements receiving a respective "personal value" from each other said computational elements by means of at least one of a plurality of decoding receivers where at least one said receiver is associated with each of said receiving computational elements, wherein each transmission between said transmitters and said receivers comprises one said computational element's "personal value," and a redundancy component, and wherein any discrepancy between said "personal value" and said redundancy component causes a decoding receiver to send an error message to a computational element associated with said decoding receiver;
   c. each computational element transmitting said "personal value" data received from each other of said computational elements by means of at least one encoding transmitter and at least one decoding receiver wherein each transmission so transmitted comprises the "personal value" previously received from at least one other of said computational elements, and a current redundancy component, and wherein any discrepancy between said "personal value" and said current redundancy component causes said receiver to send an error message to one of said computational elements;
   d. each of said computational elements accepting a first value received originating from each other of said computational elements which is not accompanied by an error message as representing the "personal value" of a computational element which first transmitted said value, and each said computational element substituting a default value for the "personal value" of any of said computational elements for which that receiving computational element does not receive a value unaccompanied by an error message; and
   e. each of said computational elements utilizing a collection of "n" "personal values" for the "n" computational elements as a data base for a program from which an output value of each said computational element is formed.

2. The process of claim 1 wherein each computational element accepts a received value as representing a personal value of an other one of said computational elements immediately after receipt of said received value if, and only if, said received value is received without an accompanying error message.

3. In a multiple computational element fault-tolerant computer system for receiving data from a plurality of input devices where data provided to said computational elements from said input devices may differ without being incorrect, a process for attaining agreement in an input data set utilized by each of a plurality of said computational elements, the process comprising the steps of:
   a. applying one of a plurality of "n" input signals to a plurality of "n" computational elements with each said computational element storing a value therein corresponding to its respective input signal, said value thereby becoming said computational elements "personal value" of the input signals;
   b. each of said computational elements transmitting its "personal value" to each other of said computational elements by means of an encoding transmitter associated with each of said computational elements and each of said computational elements receiving a respective "personal value" from each other said computational element by means of at least one of a plurality of decoding receivers where at least one said receiver is associated with each of said receiving computational elements, wherein each transmission between said transmitters and said receivers comprises one said computational element's "personal value", and a redundancy component, and wherein any discrepancy between said "personal value" and said redundancy component causes a decoding receiver to send an error message to a computational element associated with said decoding receiver;
   c. each of said computational elements accepting a first value received originating from each other of said computational elements which is not accompanied by an error message as representing the "personal value" of a computational element which first transmitted said value, and each said computational element substituting a default value for the "personal value" of any of said computational elements for which that receiving computational element does not receive a value unaccompanied by an error message; and
   d. each of said computational elements utilizing a collection of "n" "personal values" for the "n" computational elements as a data base for a program from which an output value of each said computational element is formed.

4. The process of claim 1 or 3 wherein the means used for the transmission of the "personal value" of each computational element to each other of said computational elements comprises a plurality of circuits with one of said circuits corresponding to each computational element and wherein each of said computational elements has an output port connected to one of said encoding transmitters, and each said encoding transmitter is connected to a plurality of decoding receivers, with there being at least one of said receivers for each computational element, and wherein each of said decoding receivers is connected to an input port of one of said computational elements.

5. The process of claim 4 wherein an isolation circuit is inserted at the input of each said decoding receiver whereby the condition of each said decoding receiver cannot affect the data received by any other decoding receiver.

6. The process of claim 1 or 3 wherein said encoding transmitter accepts data in bits of parallel binary data, encodes that data, adds a component of redundancy information, and transmits a resulting message serially, a bit at a time.

7. The process of claim 1 or 3 wherein each of said decoding receivers accepts data in a serial bit stream and produces parallel binary data, and when the "personal value" and the redundancy component do not correspond to each other, produces an error message.

8. The process of claim 1 or 3 wherein the method of forming said output value from said "n" "personal values" includes determining the arithmetic average of the "n" "personal values".

9. The process of claim 1 or 3 wherein the method of forming said output value from said "n" "personal values" includes determining the median value of the "n" "personal values".

10. The process of claim 1 or 3 wherein three computational elements are used in the system.

11. The process of claim 1 or 3 further comprising the step of determining an ultimate output value which corresponds to a majority of said output values of said computational elements, and wherein determination of said ultimate output value is accomplished through use of a voter circuit wherein the process of determining said majority of said output values is independent of the functioning of said computational elements, whereby a fault in any computational element can affect its respective output value, but will not inhibit said voter circuit from selecting the majority value.

12. The process of claim 11 further comprising the step of determining which if any of said output values disagrees with said ultimate output, whereby any potentially faulty computational element is identified.

13. The process of claim 1 or 3 further comprising the step of determining an ultimate output value identical to the majority of said output values of said computational elements, and the step of determining which if any of said output values disagrees with said ultimate output, whereby any potentially faulty computational element is identified.

14. In a multiple computational element fault-tolerant computer system for receiving data from a plurality of input devices where data provided to said computational elements from said input devices may differ without being incorrect, a process for attaining agreement in an input data set utilized by each of a plurality of said coputational elements, the process comprising the steps of:
   a. each of a plurality of "n" computational elements reading a value from its respective input device;
   b. each of said computational elements storing said read value as its "personal value";
   c. each said computational element transmitting its "personal value" to each other of said computational elements, and receiving said "personal values" from each other of said computational elements;
   d. each said computational element transmitting the "personal value" corresponding to each other of said computational elements to each other of said computational elements, and receiving from each other of said computational elements, said other computational element's stored "personal values" for each other of said computational elements; and
   e. each said computational element checking the accuracy of transmission of each said "personal value" received, and accepting as representative of a "personal value" for each respective computational element, a first "personal value" corresponding to each said computational element for which transmission of said "personal value" is determined to be accurate; whereby each of said "n" computational elements willhave the identical "n" values contained therein and associated identically as the respective "personal values" of the "n" computational elements.

15. The process of claim 14 wherein said transmitting and receiving of "personal values" is accomplished through the use of a transmission circuit comprising:
   an encoding transmitter associated with each of said computational elements, the transmitter being capable of accepting binary data from said respective computational element, combining said binary data with a redundancy component, and transmitting both; and
   a plurality of receiving decoders associated with each said encoding transmitter, one said decoder being connected to each of said computational elements other than the one of said computational elements to which said associated encoding transmitter is connected, and each said decoder being capable of accepting said transmission from said encoding transmitter, checking said redundancy component against said "personal value" and separately delivering both said "personal value" and, when the "personal value" does not correspond to the redundancy component, an error message to the computational element to which said decoder is connected.

* * * * *